(12) United States Patent
Liu et al.

(10) Patent No.: US 9,823,991 B2
(45) Date of Patent: Nov. 21, 2017

(54) CONCURRENT WORKLOAD SIMULATION FOR APPLICATION PERFORMANCE TESTING

(75) Inventors: Zhi C. Liu, Beijing (CN); Dang E. Ren, Beijing (CN); Peng P. Wang, Beijing (CN); Li P. Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 12/961,046

(22) Filed: Dec. 6, 2010

(65) Prior Publication Data

US 2012/0143588 A1 Jun. 7, 2012

(51) Int. Cl.
G06F 9/44 (2006.01)
G06F 11/34 (2006.01)
G06F 11/36 (2006.01)

(52) U.S. Cl.
CPC ...... *G06F 11/3414* (2013.01); *G06F 11/3696* (2013.01)

(58) Field of Classification Search
CPC .......................................................... G06F 9/44
USPC ................... 717/124, 135, 128, 131, 134
See application file for complete search history.

(56) References Cited

U.S. PATENT DOCUMENTS

| | | | | |
|---|---|---|---|---|
| 4,658,351 A * | 4/1987 | Teng | ...................... | G06F 9/4881 718/103 |
| 4,807,142 A * | 2/1989 | Agarwal | ............... | G06F 9/4881 715/201 |
| 5,168,566 A * | 12/1992 | Kuki | ...................... | G06F 9/3851 712/E9.053 |
| 5,452,461 A * | 9/1995 | Umekita | ................... | G06F 8/45 717/146 |
| 5,768,594 A * | 6/1998 | Blelloch | ............... | G06F 9/5066 717/149 |
| 6,571,215 B1 * | 5/2003 | Mahapatro | ............. | G06Q 10/06 705/7.12 |
| 2003/0120700 A1 * | 6/2003 | Boudnik | ............. | G06F 11/3688 718/102 |

(Continued)

FOREIGN PATENT DOCUMENTS

| CN | 101211311 A | 7/2008 |
|---|---|---|
| JP | 2002007232 | 1/2002 |

(Continued)

*Primary Examiner* — Jae Jeon
(74) *Attorney, Agent, or Firm* — Steven M. Greenberg, Esq.; CRGO Law

(57) ABSTRACT

Embodiments of the present invention provide a method, system and computer program product for concurrent workload simulation for application performance testing. In an embodiment of the invention, a method for concurrent workload simulation for application performance testing is provided. The method includes loading a list of recorded workloads for different tasks of a computing application under test in a workload simulator executing in memory by at least one processor of a host computer. The method also includes grouping the recorded workloads by common task in a corresponding block. Finally, the method includes generating loads for simulating performance of the computing application under test from the grouped workloads so as to require serial execution of workloads in a common block in order of appearance in the common block, but to allow concurrent execution of workloads in different blocks.

12 Claims, 2 Drawing Sheets

(56) References Cited

U.S. PATENT DOCUMENTS

| | | | |
|---|---|---|---|
| 2004/0111727 A1* | 6/2004 | Schwarzbauer et al. ..... 719/310 |
| 2004/0117170 A1* | 6/2004 | Walsh ................. H04L 63/0807 |
| | | | 703/17 |
| 2005/0149908 A1* | 7/2005 | Klianev ................ G06F 9/5038 |
| | | | 717/109 |
| 2005/0210473 A1* | 9/2005 | Inchingolo ............ G06F 9/4881 |
| | | | 718/107 |
| 2006/0026179 A1* | 2/2006 | Brown et al. .................. 707/100 |
| 2007/0118838 A1* | 5/2007 | Tsujino ................ G06F 9/4881 |
| | | | 718/103 |
| 2007/0174346 A1* | 7/2007 | Brown ............. G06F 17/30286 |
| 2007/0198665 A1* | 8/2007 | De Matteis ......... H04L 41/0843 |
| | | | 709/220 |
| 2007/0260589 A1* | 11/2007 | Yugami ............................. 707/3 |
| 2009/0327669 A1* | 12/2009 | Imada ..................... G06F 8/433 |
| | | | 712/226 |
| 2011/0022817 A1* | 1/2011 | Gaster et al. ................. 711/202 |

FOREIGN PATENT DOCUMENTS

| | | |
|---|---|---|
| JP | 2005284418 | 10/2005 |
| JP | 2009026020 | 2/2009 |

* cited by examiner

CONCURRENT WORKLOAD SIMULATION FOR APPLICATION PERFORMANCE TESTING

BACKGROUND OF THE INVENTION

Field of the Invention

The present invention relates to application performance testing and more particularly to workload simulation for application performance testing.

Description of the Related Art

In software engineering, performance testing determines how fast some aspect of a computing system performs under a particular collection of workloads. Performance testing also validates and verifies other attributes of the computing system, for example the scalability, reliability and resource usage of the computing system. Importantly, in some circumstances, performance testing of a computing system is intended demonstrate that the computing system meets particular performance criteria, oftentimes specified by the end user. In other circumstances, performance testing measures those segments of the computing system causing the computing system to perform poorly. In the latter circumstance, profiling tools identify portions of the computing system contributing most to the poor performance.

Workload simulation forms an integral part of performance testing. In workload simulation, different workloads are generated and subjected upon a computing system, in order to simulate the conditions under which the computing system will operate. To ensure precision in simulation, a workload simulation often is constructed statically. To facilitate the construction of a workload simulation scenario, the operation of the computing application can be recorded according to a scripted set of stimuli to the application. Subsequently, the recorded operation of the computing application can be played back and the performance of the computing application measured. Of note, graphical tools have been developed to permit the graphical editing of workloads to be used in workload simulation.

Workload simulation has proven highly effective for performance testing distributed applications—particularly Web applications involving a thin Web client. However, the resurgence of the rich client now permits substantially more complex workload processing and has complicated workload simulation using the traditional record-and-playback method. In this regard, a rich client can handle multiple different tasks at the same time and each task can generate a multiplicity of requests in sequence. The tasks can execute independently of one another or in collaboration with one another. The tasks also can execute concurrently. From the viewpoint of a workload simulation, however, the requests of the different tasks are merely intermixed with one another without respect to an originating task.

Traditionally, to address the intermixing of requests from different tasks in a client, loops are created to include selected requests in order to ensure that the selected requests are satisfied before subsequent requests are permitted to originate in the client. To establish loops during workload simulation, though, is to create an artificial ordering of the generation of the requests. Of course, the use of loops during workload simulation necessarily prevents concurrency of execution of tasks in the client, thereby defeating the integrity of the workload simulation.

BRIEF SUMMARY OF THE INVENTION

Embodiments of the present invention address deficiencies of the art in respect to workload simulation and provide a novel and non-obvious method, system and computer program product for concurrent workload simulation for application performance testing. In an embodiment of the invention, a method for concurrent workload simulation for application performance testing is provided. The method includes loading a list of recorded workloads for different tasks of a computing application under test in a workload simulator executing in memory by at least one processor of a host computer. The method also includes grouping the recorded workloads by common task in a corresponding block. Finally, the method includes generating loads for simulating performance of the computing application under test from the grouped workloads so as to require serial execution of workloads in a common block in order of appearance in the common block, but to allow concurrent execution of workloads in different blocks.

In one aspect of the embodiment, a synchronization point can be established amongst the blocks. Thereafter, during generation of the loads, all workloads in blocks appearing before the synchronization point can be required to execute before permitting execution of workloads of blocks appearing subsequent to the synchronization point. In another aspect of the embodiment, the recorded workloads are hypertext transfer protocol (HTTP) requests. As such, grouping the recorded workloads by common task in a corresponding block can include identifying for each of the different tasks correspondingly different strings amongst the HTTP requests placing each of the HTTP requests sharing a common one of the different strings in a common block. Additionally, each HTTP request dependent upon a result from a previously executed HTTP request can be placed in a common block.

In another embodiment of the invention, a performance testing data processing system can be configured for concurrent workload simulation. The system can include a host computer with memory and at least one processor and an operating system executing in the host computer. The system also can include a workload simulator hosted by the operating system. The workload simulator can include each of a load recorder, load editor and load generator. Finally, a block identification module can be coupled to the load editor. The module can include program code enabled to load a list of workloads, such as HTTP requests, recorded by the load recorder for different tasks of a computing application under test in the workload simulator, and to group the recorded workloads by common task in a corresponding block.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for concurrent workload simulation for application performance testing. In accordance with an embodiment of the invention, different requests for different tasks can be accumulated in a workload simulator. Requests common to a single task can be grouped together in order received in a block. Thereafter, a load generator can generate loads consistent with the requests of different blocks such that requests within a common block execute in an order prescribed by the common block, but requests of different blocks execute concurrently. In this way, the arbitrary and artificial ordering of requests from different tasks can be avoided during concurrent workload simulation of requests from different tasks within a single computing device.

Figure 1:
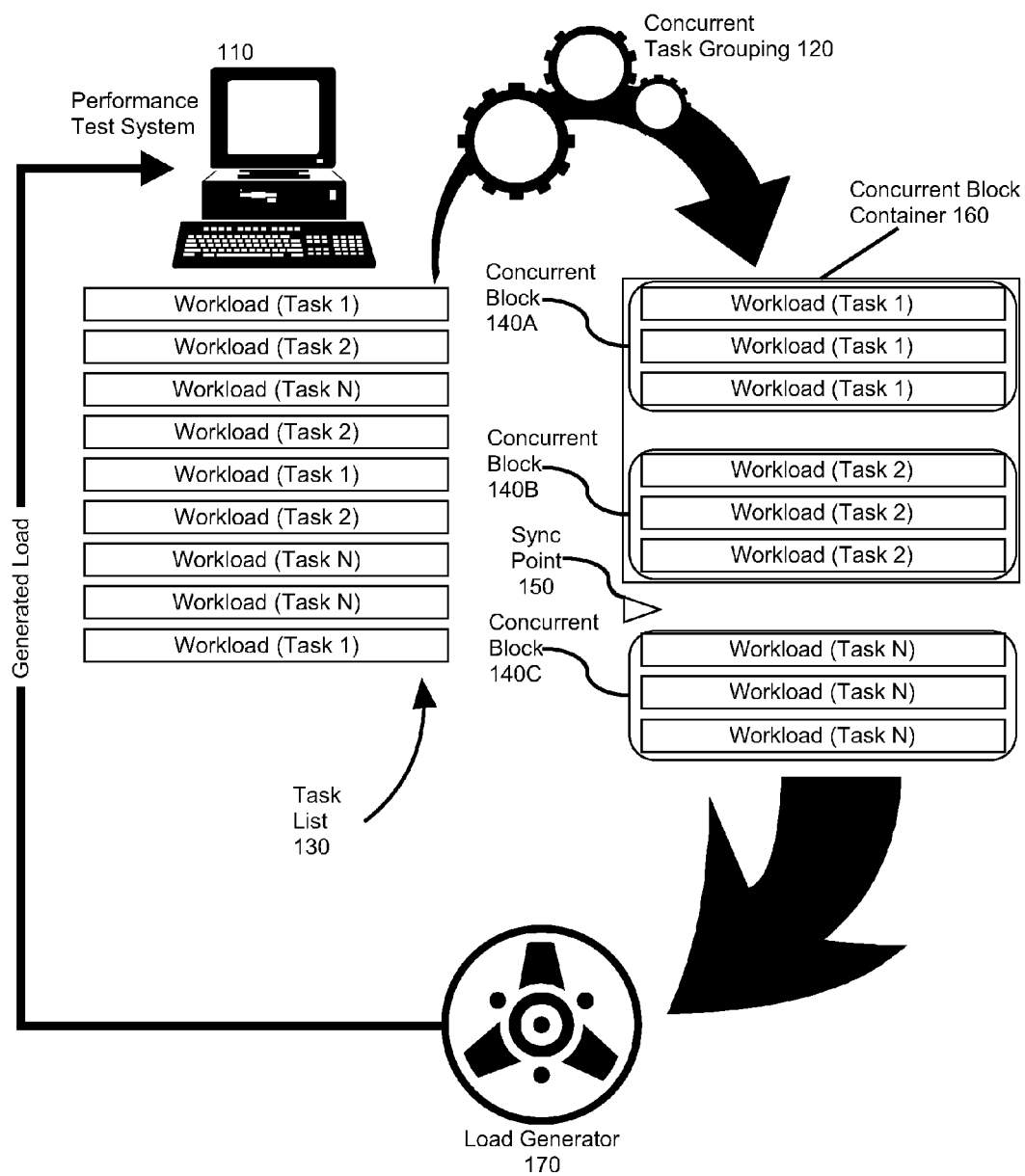
FIG. 1 is a pictorial illustration of a process for concurrent workload simulation for application performance testing.

In further illustration, FIG. 1 pictorially depicts a process for concurrent workload simulation for application performance testing. As shown in FIG. 1, a performance test system 110 can record a series of workloads 130 for different concurrently executing tasks in a computing application. Concurrent task grouping logic 120 can process the workloads 130 to group workloads for common tasks in a concurrent block 140A, 140B, 140C. Further, selected ones of the concurrent blocks 140A, 140B, 140C can be grouped in a common container 160. The order in which the workloads 130 for each task were recorded can be preserved in a corresponding one of the concurrent blocks 140A, 140B, 140C. However, no particular ordering of selected ones of the concurrent blocks 140A, 140B, 140C in a common container 160 is provided, but the ordering of multiple different containers 160 can be preserved. Of note, a synchronization point 150 can be provided amongst the concurrent blocks 140A, 140B, 140C to ensure the completion of all of the workloads 130 for respective tasks in ones of the concurrent blocks 140A, 140B, 140C preceding the synchronization point 150.

Subsequent to the automated concurrent grouping of the workloads 130 into respective ones of the concurrent blocks 140A, 140B, 140C, a load generator 170 can generate loads for simulating the performance of the computing application in the performance test system 110 according to the groupings of the workloads 130 in the concurrent blocks 140A, 140B, 140C. The generation of the loads can enforce the ordering constraints of the concurrent blocks 140A, 140B, 140C and any synchronization points 150 while permitting the concurrent execution of those of the workloads 130 of different tasks in different ones of the concurrent blocks 140A, 140B, 140C within the same container 160.

Figure 2:
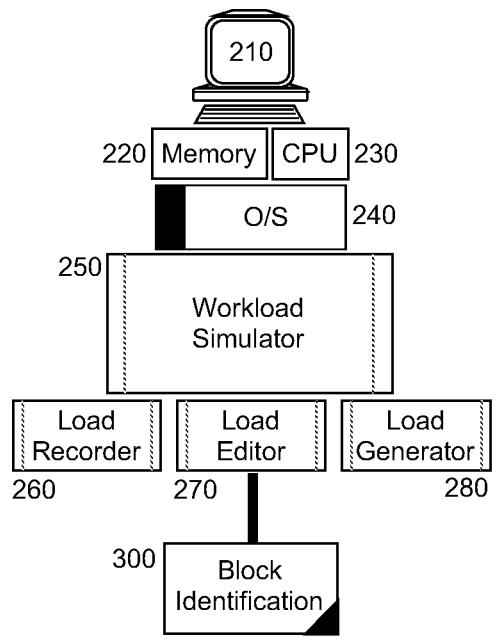
FIG. 2 is a schematic illustration of a performance testing data processing system configured for concurrent workload simulation; and, FIG. 3 is a flow chart illustrating a process for concurrent workload simulation for application performance testing.

The process described in connection with FIG. 1 can be implemented within a performance testing data processing system. In yet further illustration, FIG. 2 is a schematic illustration of a performance testing data processing system configured for concurrent workload simulation. The system can include a host computer 210 with both memory 220 and at least one processor 230 (only a single processor shown for ease of illustration). An operating system 240 can execute in the memory 220 of the host computer 210 by one or more of the processors 230. The operating system 240 can host the operation of a workload simulator 250 configured for generating different workloads and subjecting generated workloads upon a computing application under test, in order to simulate the conditions under which the computing application under test will operate.

To that end, the workload simulator 250 can be coupled to a load recorder 260, load editor 270 and load generator 280. The load recorder 260 can record workloads produced by the computing application under test during execution of the computing application under test. For example, the workloads can include requests to a service in a SOA environment. As such, those requests can be hypertext transfer protocol (HTTP) requests for processing to different remotely executing services in the SOA environment accessible at a unique network address. The load editor 270, in turn, can provide a graphical user interface (GUI) through which the recorded loads can be viewed, edited and stored for processing by the load generator 280. The load generator 280 can process a stored set of recorded and edited loads in order to generate a set of loads to be subjected upon the computing application under test in order to simulate the performance of the computing application under test.

Of note, block identification module 300 can be coupled to the load editor 270. The block identification module 300 can include program code enabled to group workloads for different tasks of the computing application under test, such as HTTP requests recorded for different tasks of the computing application under test, according to common task within a corresponding concurrent block. The grouping can be performed by comparing each of the workloads to others of the workloads to identify a common element. For example, in the case of an HTTP request, requests for the same task can share a common portion of the HTTP request such as a common identifier. Optionally, an additional grouping can be performed by placing each of the workloads that is dependent upon another workload together in the same concurrent block. Once the workloads have been grouped into concurrent blocks for a corresponding task, the grouped workloads can be passed to the load generator 280 for use by the load generator 280 in generating workloads for simulation of the computing application under test in the workload simulator 250.

Figure 3:
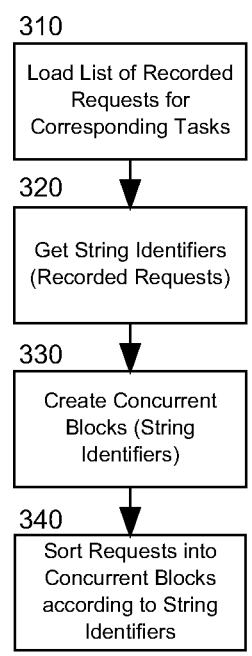

In even yet further illustration of the operation of the block identification module 300, FIG. 3 is a flow chart illustrating a process for concurrent workload simulation for application performance testing. Beginning in block 310, a list of recorded HTTP requests for different tasks of a computing application under test can be loaded and in block 320, different string identifiers each corresponding to a different one of the tasks can be loaded. In block 330, a concurrent block can be created for each unique one of the different string identifiers. Finally, in block 340, the recorded HTTP requests can be sorted into the different concurrent blocks according to a corresponding string identifier so that each concurrent block contains only those requests sharing the same string identifier.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for concurrent workload simulation for application performance testing, the method comprising:
    loading a list of recorded workloads for different tasks of a computing application under test in a workload simulator executing in memory by at least one processor of a host computer;
    grouping the recorded workloads by common task in a corresponding block and recording in each corresponding block, an order in which the recorded workloads for each task were recorded;
    generating loads for simulating performance of the computing application under test from the grouped workloads so as to require serial execution of workloads in a common block in order of appearance in the common block as recorded in the common block, but to allow concurrent execution of workloads in different blocks, wherein the generation of the loads can enforce ordering constraints of the different blocks;
    setting a synchronization point amongst the blocks; and, during generation of the loads, requiring all workloads in blocks appearing before the synchronization point to execute in an order of appearance if in a same block, but to execute concurrently in parallel if in different block, before permitting execution of workloads of blocks appearing subsequent to the synchronization point.

2. The method of claim 1, wherein the recorded workloads are hypertext transfer protocol (HTTP) requests.

3. The method of claim 2, wherein grouping the recorded workloads by common task in a corresponding block, comprises:
    identifying for each of the different tasks correspondingly different strings amongst the HTTP requests; and,
    placing each of the HTTP requests sharing a common one of the different strings in a common block.

4. The method of claim 3, further comprising placing each HTTP request dependent upon a result from a previously executed HTTP request in a common block.

5. The method of claim 1, further comprising grouping selected blocks in a common container in which workloads from different blocks execute concurrently during load generation.

6. A performance testing data processing system configured for concurrent workload simulation, the system comprising:
    a host computer with memory and at least one processor;
    an operating system executing in the host computer; a workload simulator hosted by the operating system, the workload simulator comprising each of a load recorder, load editor and load generator; and,
    a block identification module coupled to the load editor, the module comprising program code enabled to load a list of workloads recorded by the load recorder for different tasks of a computing application under test in the workload simulator, and to both group the recorded workloads by common task in a corresponding block and also record in each corresponding block, an order in which the recorded workloads for each task were recorded;
    wherein the load generator generates loads for simulating performance of the computing application under test from the grouped workloads so as to require serial execution of workloads in a common block in order of appearance in the common block as recorded in the common block, but to allow concurrent execution of workloads in different blocks, wherein the generation of the loads can enforce ordering constraints of the different blocks, and further wherein the load generator sets a synchronization point amongst the blocks and during generation of the loads, requires all workloads in blocks appearing before the synchronization point to execute in an order of appearance if in a same block, but to execute concurrently in parallel if in different block, before permitting execution of workloads of blocks appearing subsequent to the synchronization point.

7. The system of claim 6, wherein the recorded workloads are hypertext transfer protocol (HTTP) requests.

8. A computer program product for concurrent workload simulation for application performance testing, the computer program product comprising:
    a computer readable storage medium having computer readable program code embodied therewith, the computer readable program code comprising:
    computer readable program code for loading a list of recorded workloads for different tasks of a computing application under test in a workload simulator executing in memory by at least one processor of a host computer;
    computer readable program code for grouping the recorded workloads by common task in a corresponding block and recording in each corresponding block, an order in which the recorded workloads for each task were recorded;
    computer readable program code for generating loads for simulating performance of the computing application under test from the grouped workloads so as to require serial execution of workloads in a common block in order of appearance in the common block as recorded in the common block, but to allow concurrent execution of workloads in different blocks, wherein the generation of the loads can enforce ordering constraints of the different blocks;
    setting a synchronization point amongst the blocks; and, during generation of the loads, requiring workloads in blocks appearing before the synchronization point to execute in an order of appearance if in a same block, but to execute concurrently in parallel if in different block, before permitting execution of workloads of blocks appearing subsequent to the synchronization point.

9. The computer program product of claim 8, wherein the recorded workloads are hypertext transfer protocol (HTTP) requests.

10. The computer program product of claim 9, wherein the computer readable program code for grouping the recorded workloads by common task in a corresponding bock, comprises:
    computer readable program code for identifying for each of the different tasks correspondingly different strings amongst the HTTP requests; and,
    computer readable program code for placing each of the HTTP requests sharing a common one of the different strings in a common block.

11. The computer program product of claim 10, further comprising computer readable program code for placing each HTTP request dependent upon a result from a previously executed HTTP request in a common block.

12. The computer program product of claim 8, further comprising computer readable program code for grouping selected blocks in a common container in which workloads from different blocks execute concurrently during load generation.

* * * * *